United States Patent

Clark

[15] 3,665,607
[45] May 30, 1972

[54] FLIGHT LINE CONTINUATION PROJECTION DEVICE FOR AIR NAVIGATION

[72] Inventor: Kenneth D. Clark, 2029 Westover Drive, Pleasant Hill, Calif. 94523

[22] Filed: Feb. 24, 1970

[21] Appl. No.: 13,527

[52] U.S. Cl. .............................. 33/1 SD, 33/76 VA, 33/91, 35/42
[51] Int. Cl. .......................................... B43l 5/00
[58] Field of Search ............... 33/15 D, 1 R, 76 VA, 91.1 N, 33/76 R, 75 R; 35/42

[56] References Cited

UNITED STATES PATENTS

| | | | |
|---|---|---|---|
| 1,454,782 | 5/1923 | Wimmer | 33/91 |
| 833,133 | 10/1906 | Howg | 33/91 |

*Primary Examiner*—William D. Martin, Jr.
*Attorney*—William R. Piper

[57] ABSTRACT

A sectional aeronautical chart has the geographical area bounded by the chart divided into two North and South areas, the South area being shown on one face of the chart and the North area being shown on the opposite chart face. Where a pilot wishes to plot his flying course from a point of departure on one face of the chart to a destination point on the opposite chart face, it is difficult to project the flight line continuation onto the opposite face of the chart and maintain the same angle. My device comprises two arms pivoted together and adapted to receive a sectional aeronautical chart therebetween with one arm overlying one chart face and the other arm overlying the other face and the pivot point contacting the chart edge which is a common border line between the two chart faces. Means is provided for simultaneously swinging the two arms in opposite directions about their common pivot so that the angle of the flight line depicted by the arm overlying one chart face will be continued onto the opposite chart face at the same angle by the other arm that overlies this face.

7 Claims, 4 Drawing Figures

PATENTED MAY 30 1972 3,665,607
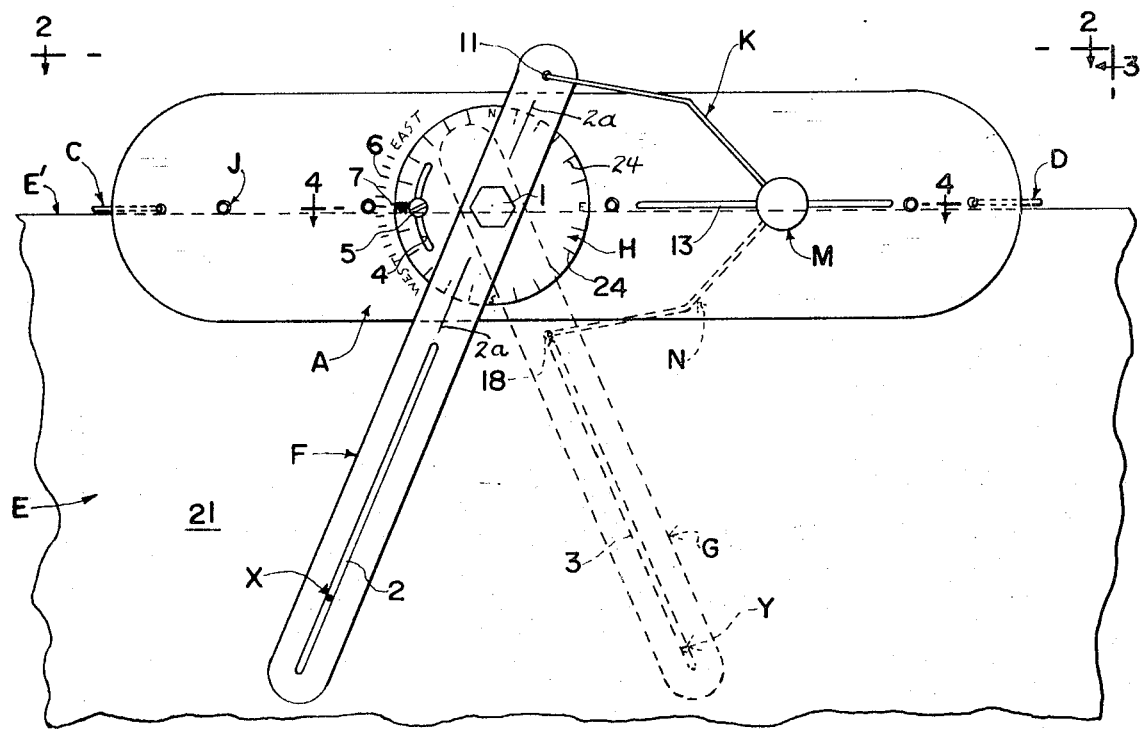
*Fig-1*
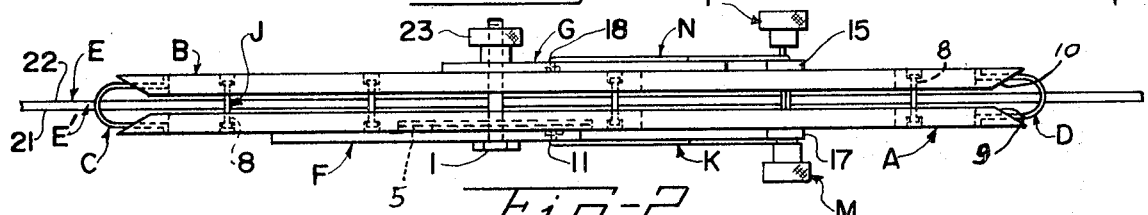
*Fig-2*
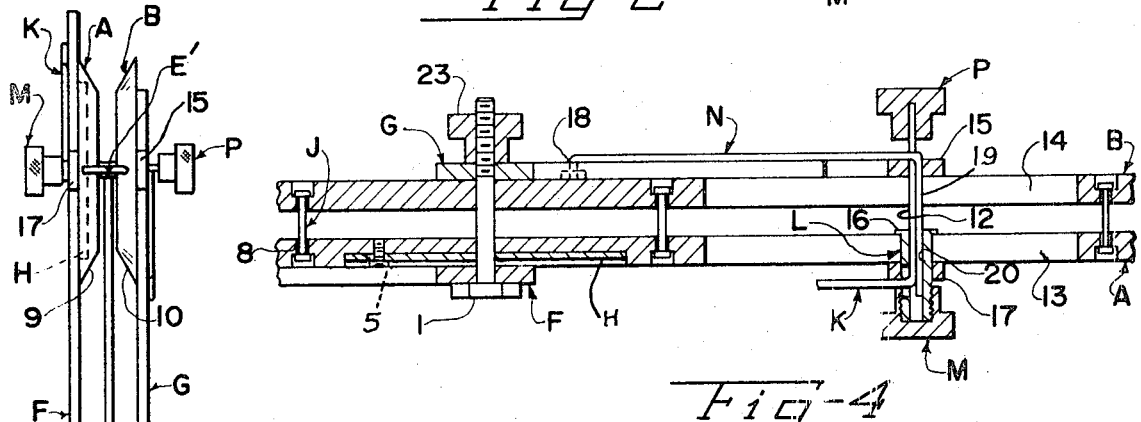
*Fig-3*     *Fig-4*
INVENTOR.
KENNETH D. CLARK
BY
William R. Piper
ATTORNEY

FLIGHT LINE CONTINUATION PROJECTION DEVICE FOR AIR NAVIGATION

BACKGROUND OF THE INVENTION

FIELD OF THE INVENTION

A pilot in using a sectional aeronautical chart has difficulty in establishing a correct flight line between two points on the chart where the point of departure, for example, is on one face of the chart and the destination point is on the opposite chart face. With my device, the chart or map would be inserted between the two transparent arms and the pivot point connecting the two arms would be brought into contact with the upper edge of the chart because this edge constitutes a common boundary line between the two contiguous geographic areas, one of the areas appearing on one face of the chart or map and the other area appearing on the opposite face. The arm overlying the front face of the chart or map would be aligned so as to extend over the point of departure indicated on this chart face. Then the chart with my device clamped thereto would be turned over to expose the other chart face and the operator would check the other arm to see whether it extended across the point of destination indicated on this chart face. If it did not, the operator would simultaneously swing both arms in opposite directions through equal arcs until the arm on the front chart face extended across the departure point on the chart and the other arm would extend across the destination point on the opposite chart face whereupon the device and its arms would be clamped to the chart so as to maintain the setting and permit the chart and device to be moved as a unit.

SUMMARY OF THE INVENTION

An object of my invention is to provide a flight line continuation projection device for air navigation that can be quickly and readily applied to a sectional aeronautical chart or the like, that depicts a geographical area in two halves, one half being shown on one face of the chart and the other half being shown on the opposite chart face with the common boundary line between the two faces coinciding with one of the chart edges. My device is applied to the chart so that its two transparent flight indicating arms will straddle the chart. The two arms have a common pivot that is adapted to contact with the chart or map edge that constitutes the common boundary line between the two map areas. Novel means is used for swinging the two arms simultaneously in opposite directions and through equal arcs. This permits the operator to adjust the device along the common boundary edge and to swing the arms into angles that will cause one flight indicating arm to extend across the point of departure shown on one map or chart face and will cause the other flight indicating arm to extend across the destination point shown on the other map or chart face, the two arms designating a straight line flight path between the departure point and the destination point.

BRIEF DESCRIPTION OF THE DRAWINGS

FIG. 1 is a front elevation of the device as shown applied to a chart or map that has two contiguous geographic areas, one appearing on each face of the chart.

FIG. 2 is a top plan view of FIG. 1.

FIG. 3 is an end view of the device when looking from the right hand end of FIG. 1.

FIG. 4 is an enlarged horizontal section through the device and is taken substantially along the line 4—4 of FIG. 1.

DESCRIPTION OF THE PREFERRED EMBODIMENT

In carrying out my invention I provide two chart or map gripping members A and B, see FIGS. 1 and 3. These members are yieldingly held apart by U-shaped springs C and D and provide sufficient space to receive a chart or map E therebetween, as shown in FIG. 3. Two transparent course or flight indicating arms F and G are rotatably mounted on the shank of a bolt 1 that projects through both of the members A and B, as is clearly shown in FIGS. 1 and 4. The front arm F overlies the front member A while the rear arm G overlies the rear member B. The arm F has a longitudinally extending slot 2 that is wide enough to slidably receive a lead pencil or other writing instrument so that a flight indicating line can be drawn on the front surface of the chart or map E when the front arm is swung into the proper position. In like manner the rear arm G has a longitudinally extending slot 3 that is wide enough to slidably receive the writing instrument, not shown, so that a flight indicating line can be drawn on the reverse surface of the map E.

FIG. 1 shows a compass rose H rotatably mounted on the bolt 1 and receivable in a circular recess provided in the front face of the member A. The compass rose underlies the transparent arm F and it has an arcuate slot 4. A screw 5 extends through the slot 4 and into the front member A, see FIG. 4. The screw may be tightened so that its head will bind against the top of the compass rose for securing it from accidental rotation. The member A has as arcuate scale 6 placed adjacent to the periphery of the compass rose H and this scale is calibrated to indicate magnetic variations. The compass rose H carries a printed arrow 7 on its face that moves along the magnetic variation scale 6 when the compass rose is rotated about the bolt 1. The operator can adjust the compass rose to correct for magnetic variation and can then tighten the screw 5 to secure the compass rose in its adjusted position.

The two chart-gripping members A and B have a plurality of headed pins J that are inserted in aligned openings 8 in both members and the axes of these pins lie in a common plane that also extends through the axis of the bolt 1. The spring clips C and D can also lie in the same plane. The pin receiving aligned openings 8 in the members A and B have enlarged recesses that open out onto the outer surfaces of these members. The inner ends of the recesses form shoulders against which the heads of the pins bear. FIGS. 2 and 3 show how the perimeters of the two members A and B are inwardly chamfered at 9 and 10, respectively, to guide the upper edge E' of the chart or map E between the two members. The headed pins J constitute means for interconnecting the members A and B and for holding them in parallel relation.

Before describing how the chart or map E can be gripped between the two members A and B, it is best to set forth the means or mechanism for swinging the two arms F and G simultaneously in opposite directions through equal arcs. A wire arm or link K has one end 11 pivotally connected to the front transparent arm F and has its other end 12 bent at right angles and projecting through a pair of guide slots 13 and 14 provided in the chart-gripping members A and B, respectively, see FIG. 4. The wire end 12 extends through a washer 15 that is adapted to slide over the rear face of the member B. The wire end 12 also extends through a sleeve L that is slidably received in the slot 13. This sleeve has a flange 16 at its inner end that slides over the inner surface of the chart-gripping member A. A washer 17 is slidably mounted on the sleeve L and rides over the outer surface of the member A. The outer end of the sleeve L is exteriorly threaded and receives the threaded bore of a knob M.

Another wire arm or link N has one end 18 pivotally connected to the rear transparent arm G at a point on the opposite side of the bolt 1 from that of the pivot point 11 for the arm F, but at the same distance from the bolt, see FIGS. 1 and 4. The other end 19 of the wire arm N is bent at right angles and parallels the bent end 12 of the wire arm K. The end 19 is received in a longitudinal bore 20 provided in the sleeve L. The outer extremity of the wire end 12 has a knob P secured thereto. It will be seen from this arrangement of parts that either the knobs M or P can be gripped for sliding the bents ends 12 and 19 of the wire arms K and N, respectively, along the parallel and aligned slots 13 and 14 for swinging the transparent arms F and G in opposite directions about the bolt 1 and through equal arcs. The knob M can be tightened on the threaded portion of the sleeve L for gripping the member A between the flange 16 and the washer 17 against which the knob M clamps the wire arm K. The transparent arms F and G will now be held in their adjusted positions.

OPERATION

From the foregoing description of the various parts of the device, the operation may be readily understood. If the operator wishes to know the direction his flight is to take from the point X on the front face 21 of the chart or map E to the point Y on the rear face 22 of the same map, he places the map between the two members A and B and moves the map until its upper edge E' abuts the row of pins J, see FIG. 1. He also adjusts the compass rose H to correct it for magnetic North by rotating the compass rose so that its pointer 7 indicates the correct position on the magnetic variation scale 6, whereupon the screw 5 is tightened to prevent the accidental rotation of the compass rose.

The device is now slid along the pins J until the slot 2 in the front transparent arm F aligns with the point X on the front face 21 of the chart or map E. The operator then holds the device on the map to prevent relative movement between the two and turns the map over to see whether the slot 3 in the rear transparent arm G aligns with the point Y on the rear surface 22 of the map E, see FIG. 1. If it does not, then the operator loosens the knob M and moves the knob so that the arms F and G swing in the proper direction and through one or more trials does line up the slot 2 of the front arm F on the point X and also causes the slot 3 of the rear arm G to line up with the point Y on the rear face 22 of the map. The map E may have to be slid laterally with respect to the members A and B during this correct positioning of the transparent arms F and G to cause their slots 2 and 3, respectively, to intersect the point X on the front face of the chart or map and to intersect the point Y on the rear face.

The knob M is now tightened to prevent the accidental swinging of the arms F and G and the nut 23 is tightened on the bolt 1 to bring the two members A and B into map-gripping relation with respect to the chart or map E. The front arm F has a line 2a that is adjacent to the pivoted end 11 of the link K, see FIG. 1, and is in alignment with the slot 2 in the arm. This line 2a extends over one of the calibrations 24 on the compass rose H and will indicate the number of degrees either East or West of magnetic North, "N" the pilot must take in order to fly his airplane in a direct line from the point X on the front face 21 on the chart or map E to the point Y on the rear face 22. If desired, the operator may use the slots 2 and 3 in the transparent arms F and G to direct a pencil or other marking device which the operator may use for drawing a straight line between the two points X and Y, one part of this line appearing on the front face 21 of the chart or map E and intersecting the point X and the other part of the line appearing on the rear face 22 and intersecting the point Y.

Although in this specification I have described with great particularity the essential parts or elements comprised in my invention, it will, of course, be understood that I may make various changes therein without departing from the spirit of my invention and that come within the scope of the claims.

I claim:

1. In combination:
   a. a pair of map-gripping members adapted to receive a map therebetween that covers a geographical area, consecutive portions of the area being shown on opposite faces of the map with an edge of the map lying at the junction of the consecutive portions;
   b. means for interconnecting the members for holding them in parallel relation;
   c. a first course indicating arm movable over one face of the map that has one of the consecutive portions of the geographical area;
   d. a second course indicating arm movable over the opposite face of the map that has the other consecutive portion of the geographical area;
   e. means for pivotally connecting the two arms together, said last-named means contacting the map edge that lies at the junction of the consecutive portions of the geographical area; and
   f. means for swinging the arm simultaneously in opposite directions through equal arcs about their common pivot means so that said first course indicating arm can register with a desired geographical location on one face of the map and the second course indicating arm can register with a second desired geographical location on the opposite face of the map.

2. The combination as set forth in claim 1: and in which
   a. yielding means is provided for holding the map-gripping members in spaced relation with respect to each other so that a map can be positioned between said members; and
   b. said pivotal connecting means for the two arms includes means for moving said members into gripping relation with the map after the two arms have been swung into desired angular positions and register with the desired geographical locations on opposite faces of the map.

3. The combination as set forth in claim 1: and in which
   a. the first and second course indicating arms are transparent and each has a linear slot that is in line with the common pivot means interconnecting the two arms, the slots being adapted to receive the lead of a pencil or other marking device that can be used for drawing course indicating lines on both faces of the map.

4. The combination as set forth in claim 1: and in which
   a. said arm swinging means includes a knob movable in a radial direction with respect to said pivotal means that connects the two course indicating arms together, the radial direction in which said knob is movable toward or away from said pivot means coinciding with the edge of the map lying at the junction of the two consecutive geographical portions of the map;
   b. a first link having one end pivotally connected to said knob and its other end pivotally connected to said first course indicating arm at a predetermined distance to one side of said pivotal means for the arms; and
   c. a second link having one end pivotally connected to said knob and its other end pivotally connected to said second course indicating arm at the same distance to the other side of said pivotal means for the arms as said first link is spaced from said pivotal means;
   d. whereby a movement of said knob in a radial direction with respect to said pivotal means will cause said links to swing said course indicating arms through equal arcs and in opposite directions.

5. The combination as set forth in claim 4: and in which
   a. said map-gripping members have radially extending slots that coincide with the edge of the map that is received between said members;
   b. said first link having a bent portion that is slidably received in both slots;
   c. said second link having a bent portion that is slidably received in both slots; and
   d. said knob being operatively connected to both bent portions of the links for holding them close together.

6. The combination as set forth in claim 1: and in which
   a. a compass rose rotatably mounted on the pivotal means that interconnects the two course indicating arms and being disposed adjacent to the outer face of one of said map-gripping members, this same outer face having a magnetic variation scale printed thereon and disposed adjacent to the periphery of said compass rose;
   b. said compass rose having a pointer at its periphery that rides over said magnetic variation scale when said compass rose is rotated into the proper position; and
   c. means for securing said compass rose against accidental rotation after an adjustment has been made.

7. In combination with a map having adjacent geographical areas printed on the opposite side of the sheet; and with the straight edge of the map being a common boundary line to both areas;

a. a first line-indicating means movable over one face of the map;
b. a second line-indicating means movable over the opposite face of the map;
c. means for pivotally connecting the two line-indicating means together, said pivot means contacting the said straight edge of the map; and d. means for swinging both line-indicating means simultaneously in opposite directions through equal arcs about their common pivot means so that the line-indicating means will indicate the continuation of a straight line from the geographical area shown on one side of the map to the adjoining geographical area shown on the other side of the map, said pivot means including means for maintaining the second line-indicating means on both sides of the map regardless of their angular positions, in a position with respect to the map that an imaginary line bisecting the angle formed between the two line-indicating means, will always be at right angles to the common straight edge of the map when the pivot means contacts said edge.

* * * * *